United States Patent
Li et al.

(10) Patent No.: US 10,326,151 B2
(45) Date of Patent: Jun. 18, 2019

(54) MODULAR STRUCTURE OF FUEL CELL

(71) Applicant: INDUSTRIAL TECHNOLOGY RESEARCH INSTITUTE, Hsinchu (TW)

(72) Inventors: Chun-Han Li, Hsinchu (TW); Chih-Wei Chien, Hsinchu (TW); Chien-Jung Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 52 days.

(21) Appl. No.: 15/375,270

(22) Filed: Dec. 12, 2016

(65) Prior Publication Data
US 2018/0123147 A1    May 3, 2018

(30) Foreign Application Priority Data
Oct. 31, 2016    (TW) .............................. 105135220 A (51) Int. Cl.
| | |
|---|---|
| *H01M 8/0297* | (2016.01) |
| *H01M 8/0276* | (2016.01) |
| *H01M 8/1004* | (2016.01) |
| *H01M 8/247* | (2016.01) |
| *H01M 8/249* | (2016.01) |
| *H01M 8/1018* | (2016.01) |

(52) U.S. Cl.
CPC ....... *H01M 8/0297* (2013.01); *H01M 8/0276* (2013.01); *H01M 8/1004* (2013.01);
(Continued)

(58) Field of Classification Search
None
See application file for complete search history.

(56) References Cited

U.S. PATENT DOCUMENTS

| | | |
|---|---|---|
| 7,294,426 B2 | 11/2007 | Yang |
| 7,910,037 B2 | 3/2011 | Itoh et al. |

(Continued)

FOREIGN PATENT DOCUMENTS

| | | |
|---|---|---|
| CN | 1787264 | 6/2006 |
| TW | 200908427 | 1/2006 |

(Continued)

OTHER PUBLICATIONS

Hakenjos, et al. "A PEM fuel cell for combined measurement of current and temperature distribution, and flow field flooding", Journal of Power Sources, Nov. 2003, pp. 213-216.
(Continued)

*Primary Examiner* — Wyatt P McConnell
(74) *Attorney, Agent, or Firm* — Amin, Turocy & Watson LLP (57) ABSTRACT

A modular structure of a fuel cell is provided, which includes a membrane electrode assembly (MEA), at least one first electrode plate, at least one second electrode plate, at least one first fixing element and at least one second fixing element. The first electrode plate is disposed at one side of the MEA and has at least one first through hole. The second electrode plate is disposed at the other side of the MEA and has at least one second through hole corresponding to the first through hole. The first fixing element and the second fixing element correspond to each other, and are joined to each other through the first through hole and the second through hole to fix the first electrode plate and the second electrode plate for the first electrode plate, the MEA and the second electrode plate to form a single cell module.

17 Claims, 7 Drawing Sheets

(52) U.S. Cl.
CPC ........... *H01M 8/247* (2013.01); *H01M 8/249* (2013.01); *H01M 2008/1095* (2013.01)

(56) References Cited

U.S. PATENT DOCUMENTS

| | | | |
|---|---|---|---|
| 8,268,512 B2 | 9/2012 | Morimoto et al. | |
| 2004/0053099 A1* | 3/2004 | Franklin | H01M 2/08 429/437 |
| 2009/0291343 A1 | 11/2009 | Geiss | |

FOREIGN PATENT DOCUMENTS

| | | |
|---|---|---|
| TW | M451674 | 4/2013 |
| TW | I501461 | 9/2015 |

OTHER PUBLICATIONS

Wang, et al. "A review of polymer electrolyte membrane fuel cells: Technology, applications, and needs on fundamental research", Applied Energy, Sep. 2010, pp. 981-1007.

Ye, et al. "A review on the sealing structures of membrane electrode assembly of proton exchange membrane fuel cells", Journal of Power Sources, Jan. 2013, pp. 285-292.

Costamagna, et al. "Quantum jumps in the PEMFC science and technology from the 1960s to the year 2000", Journal of Power Sources, Apr. 2001, pp. 242-252.

Lee, et al. "Investigation of PVD coating on corrosion resistance of metallic bipolar plates in PEM fuel cell", Journal of Materials Processing Technology, Sep. 2003, pp. 688-693.

* cited by examiner

MODULAR STRUCTURE OF FUEL CELL

CROSS-REFERENCE TO RELATED APPLICATION

The present disclosure is based on, and claims priority from Taiwan Application Number 105135220, filed Oct. 31, 2016, the disclosure of which is hereby incorporated by reference herein in its entirety.

BACKGROUND

1. Technical Field

The present disclosure relates to fuel cells, and, more particularly, to a modular structure of a fuel cell.

2. Description of Related Art

A fuel cell is formed by stacking a plurality of single cell modules together, and each of the single cell modules is composed of multiple layers of components. For example, a single cell module employing graphite plates may have eleven layers of components, including one proton exchange membrane layer, two catalyst layers, two gas diffusion layers, one cathode plate, one anode plate and four gaskets; and a single cell module using metal plates can have thirteen layers of components, that is, the eleven layers of components just mentioned plus one cathode water cooling plate and one anode water cooling plate.

Therefore, in the case of a one-kilowatt fuel cell, forty single cell modules are required, adding up to a total of 440 layers or 520 layers of components. As the fuel cell has so many layers of components, when it comes to assembly of the fuel cell and replacement or repair of the single cell modules, issues such as low assembly accuracy, long assembly time, poor replacement efficiency, slow repair rate or poor air tightness are encountered.

Therefore, there is a need for a solution that addresses the aforementioned issues in the prior art.

SUMMARY

A modular structure of a fuel cell in accordance with the present disclosure is provided, including: a membrane electrode assembly (MEA); at least one first electrode plate disposed at one side of the membrane electrode assembly having at least one first through hole; at least one second electrode plate disposed at the other side of the membrane electrode assembly having at least one second through hole corresponding to the first through hole; at least one first fixing element; and at least one second fixing element corresponding to the at least one first fixing element, wherein the first fixing element and the second fixing element are joined to each other through the first through hole and the second through hole to fix the first electrode plate and the second electrode plate for the first electrode plate, the MEA and the second electrode plate to form a single cell module.

DETAILED DESCRIPTION

Figure 1A:
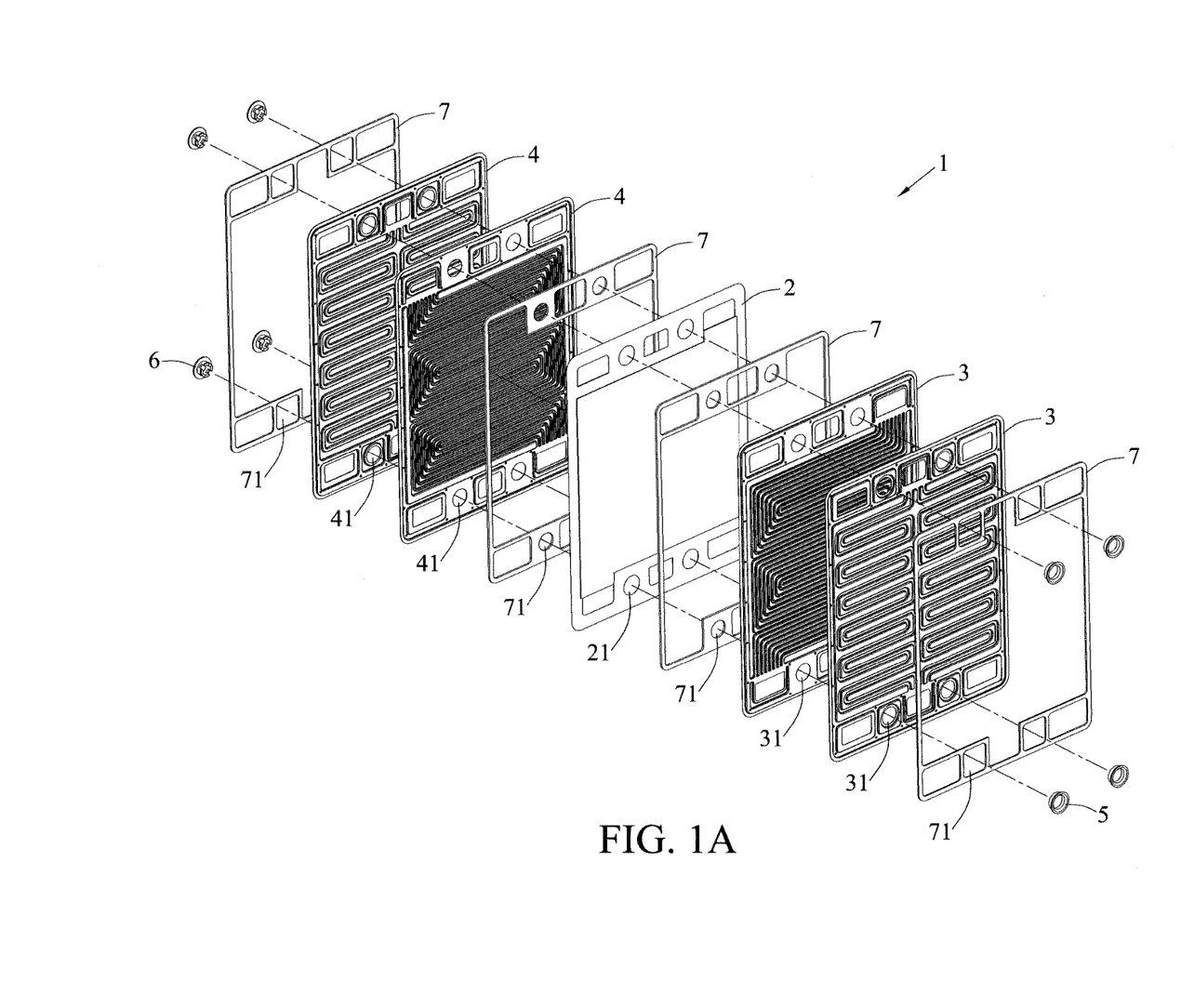
FIG. 1A is an exploded view of a modular structure of a fuel cell in accordance with the present disclosure.
Figure 1B:
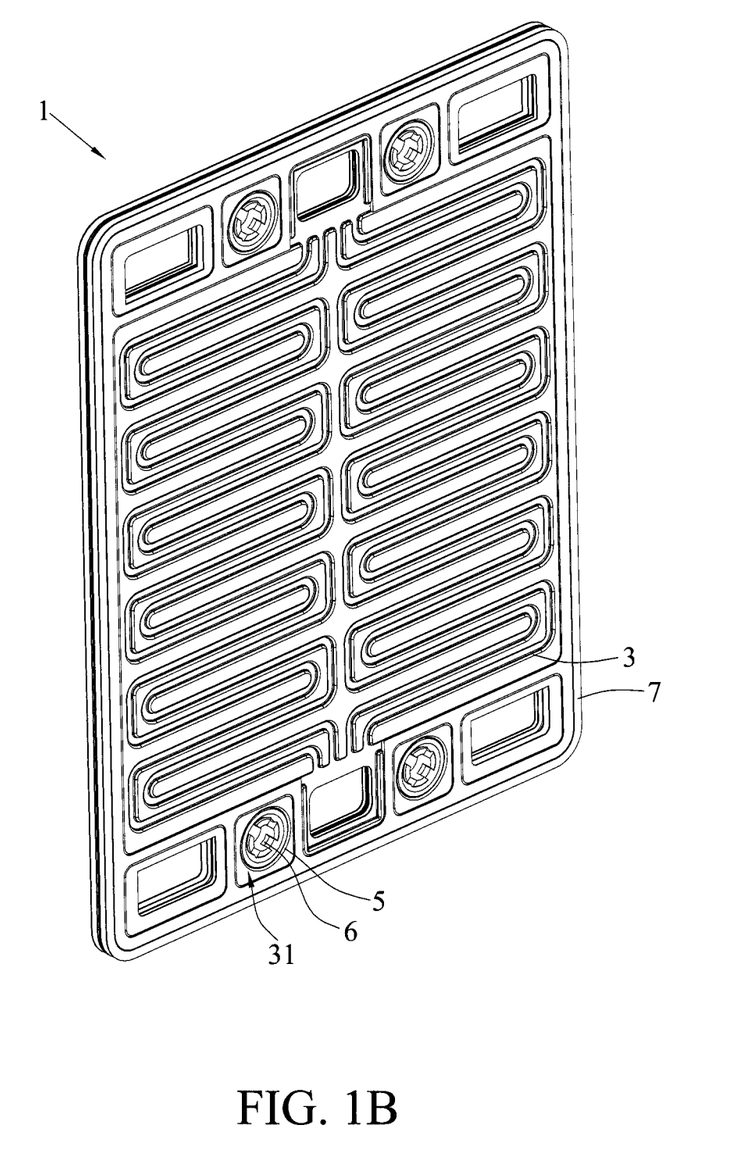
FIG. 1B is a schematic view depicting the modular structure of the fuel cell in FIG. 1A after assembly in accordance with the present disclosure.
Figure 1C:
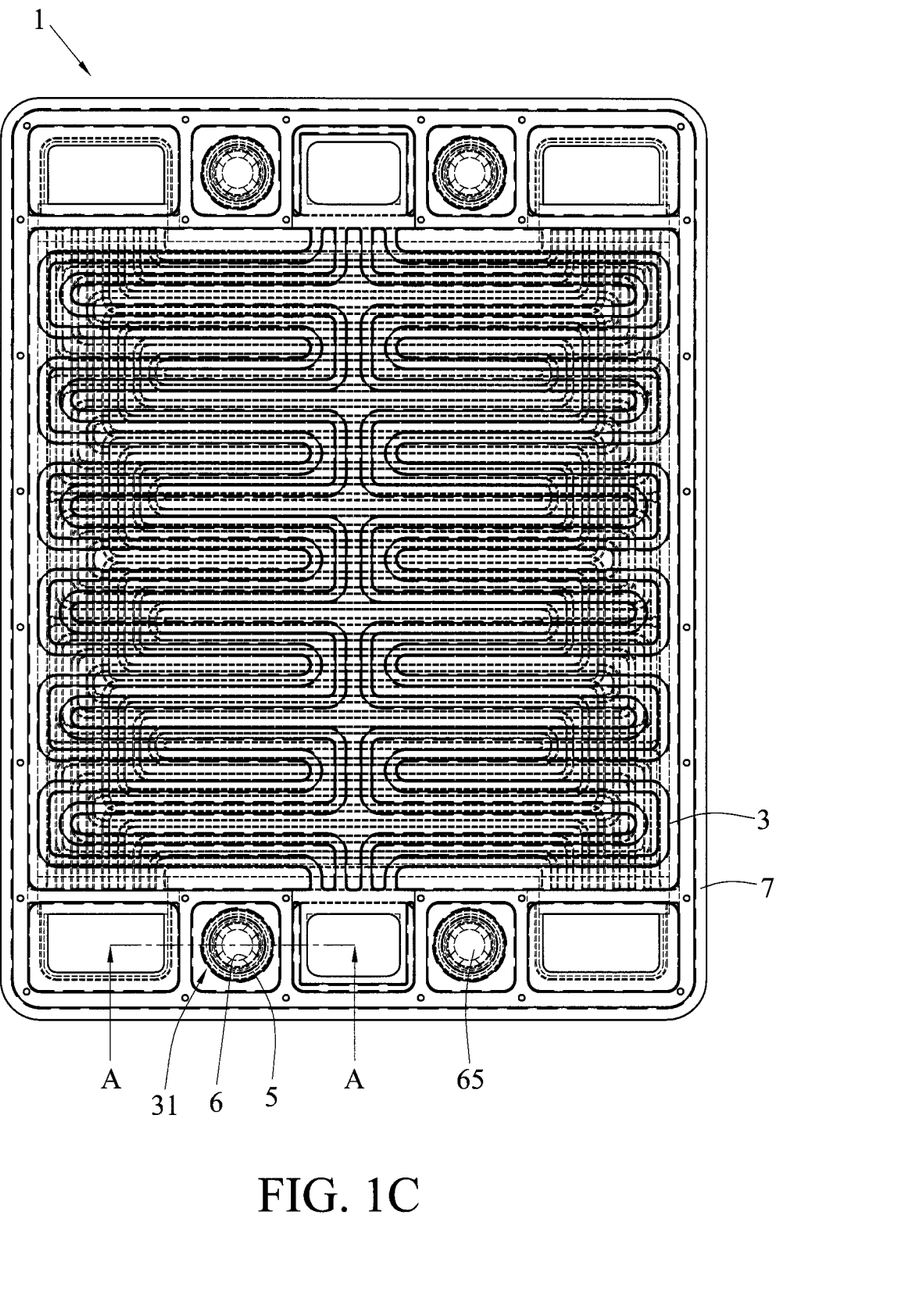
FIG. 1C is a top view of the modular structure of the fuel cell in FIG. 1B in accordance with the present disclosure.
Figure 1D:
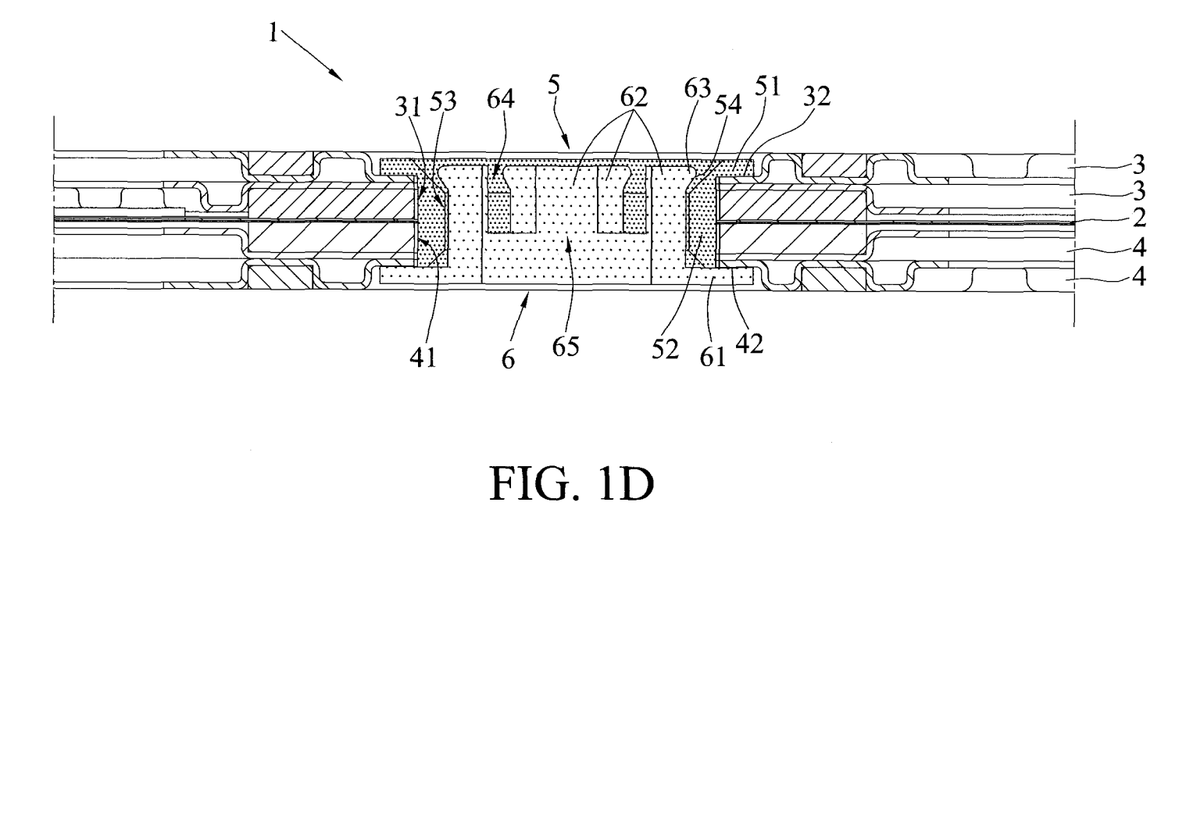
FIG. 1D is a cross-sectional view of the modular structure of the fuel cell of FIG. 1C along line A in accordance with the present disclosure.
Figure 2A:
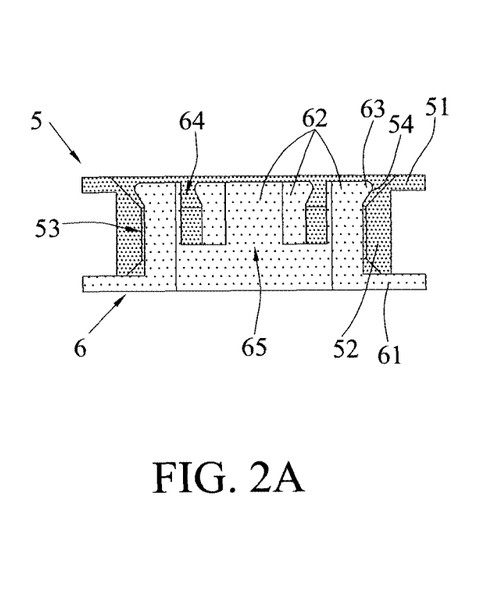
FIG. 2A is a cross-sectional view of a first fixing element and a second fixing element of the modular structure of the fuel cell in FIG. 1D in accordance with the present disclosure.
Figure 2B:
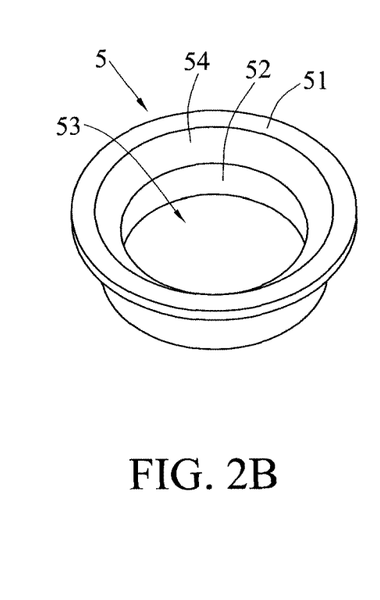
FIG. 2B is an isometric view of the first fixing element of the modular structure of the fuel cell in FIG. 2A in accordance with the present disclosure.
Figure 2C:
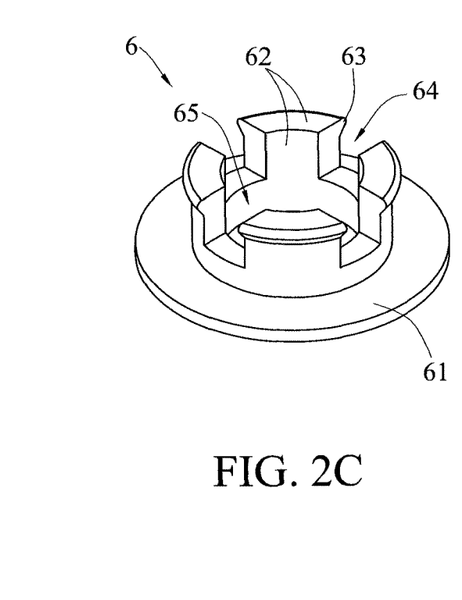
FIG. 2C is an isometric view of the second fixing element of the modular structure of the fuel cell in FIG. 2A in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing FIG. 1A is an exploded view of a modular structure 1 of a fuel cell (see fuel cell 8 in FIG. 4) in accordance with the present disclosure. FIG. 1B is a schematic view depicting the modular structure 1 of the fuel cell in FIG. 1A after assembly in accordance with the present disclosure. FIG. 1C is a top view of the modular structure 1 of the fuel cell of FIG. 1B in accordance with the present disclosure. FIG. 1D is a cross-sectional view of the modular structure 1 of the fuel cell in FIG. 1C along line A in accordance with the present disclosure. FIG. 2A is a cross-sectional view of a first fixing element 5 and a second fixing element 6 of the modular structure 1 of the fuel cell of FIG. 1D in accordance with the present disclosure. FIG. 2B is an isometric view of the first fixing element 5 of the modular structure 1 of the fuel cell in accordance with the present disclosure of FIG. 2A. FIG. 2C is an isometric view of the second fixing element 6 of the modular structure 1 of the fuel cell of FIG. 2A in accordance with the present disclosure.

As shown in FIGS. 1A to 2C, the modular structure 1 essentially includes a Membrane Electrode Assembly (MEA) 2, at least one (e.g., two) first electrode plate 3, at least one (e.g., two) second electrode plate 4, at least one (e.g., four) first fixing element 5, and at least one (e.g., four) second fixing element 6.

The MEA 2 may include a proton exchange membrane layer, at least one (e.g., two) catalyst layers, and at least one (e.g., two) gas diffusion layer, but the present disclosure is not limited as such. The first electrode plate 3 can be disposed at one side of the MEA 2, and includes at least one (e.g., four) first through hole 31. The second electrode plate 4 can be disposed at the other side of the MEA 2, and includes at least one (e.g., four) second through hole 41 corresponding to the first through hole 31.

The first electrode plate 3 and/or the second electrode plate 4 can be a metal plate, a graphite plate or a composite graphite plate. Alternatively, the first electrode plate 3 and/or the second electrode plate 4 is an anode plate, a cathode plate, a bipolar plate, etc. Alternatively, at least one first electrode plate 3 or at least one second electrode plate 4 can include two metal plates (e.g., a water cooling metal plate and a fuel metal plate), and the two metal plates can be combined together through stamping or laser welding.

The first fixing element 5 and the second fixing element 6 correspond to each other, and are joined to each other through the first through hole 31 and the second through hole 41 to fix the first electrode plate 3 and the second electrode plate 4, respectively, so as to allow the first electrode plate 3, the MEA 2, and the second electrode plate 4 to form a single cell module, such as a detachable single cell module.

The MEA 2 may include at least one (e.g., four) third through hole 21 corresponding to the first through hole 31 and the second through hole 41, such that the first fixing element 5 and the second fixing element 6 may be joined together through the first through hole 31 to the third through hole 21 to fix the first electrode plate 3, the MEA 2, and the second electrode plate 4 together, thereby forming a single cell module from the first electrode plate 3, the MEA 2, and the second electrode plate 4.

As shown in FIGS. 1D to 2C, the first fixing element 5 and the second fixing element 6 include a first engaging portion 51 and a second engaging portion 61, respectively. The first engaging portion 51 and the second engaging portion 61 can be engaged with a portion of a surface 32 of the first electrode plate 3 (e.g., the upper surface of the first electrode plate 3 at the first through hole 31) and a portion of a surface 42 of the second electrode plate 4 (e.g., the lower surface of the second electrode plate 4 at the second through hole 41), respectively.

The first fixing element 5 may include a ring portion 52 connected to the first engaging portion 51. The ring portion 52 of the first fixing element 5 can be engaged among the second fixing element 6, the MEA 2, the first electrode plate 3, and the second electrode plate 4. The first fixing element 5 may include a first via hole 53. The second fixing element 6 may include at least two protruding portions 62. The at least two protruding portions 62 pass through the first via hole 53, so as to fasten the second fixing element 6 to the first fixing element 5.

The first fixing element 5 may include a bevel 54 between the first engaging portion 51 and the ring portion 52. Each of the at least two protruding portions 62 of the second fixing element 6 has a flange 63 that abuts against the bevel 54 of the first fixing element 5. The second fixing element 6 may include at least two concave portions 64 (or space flexible portion) between the at least two protruding portions 62. The space of the at least two concave portions 64 can be compressed, so as to force the second fixing element 6 to be engaged with the first fixing element 5.

Figure 4:
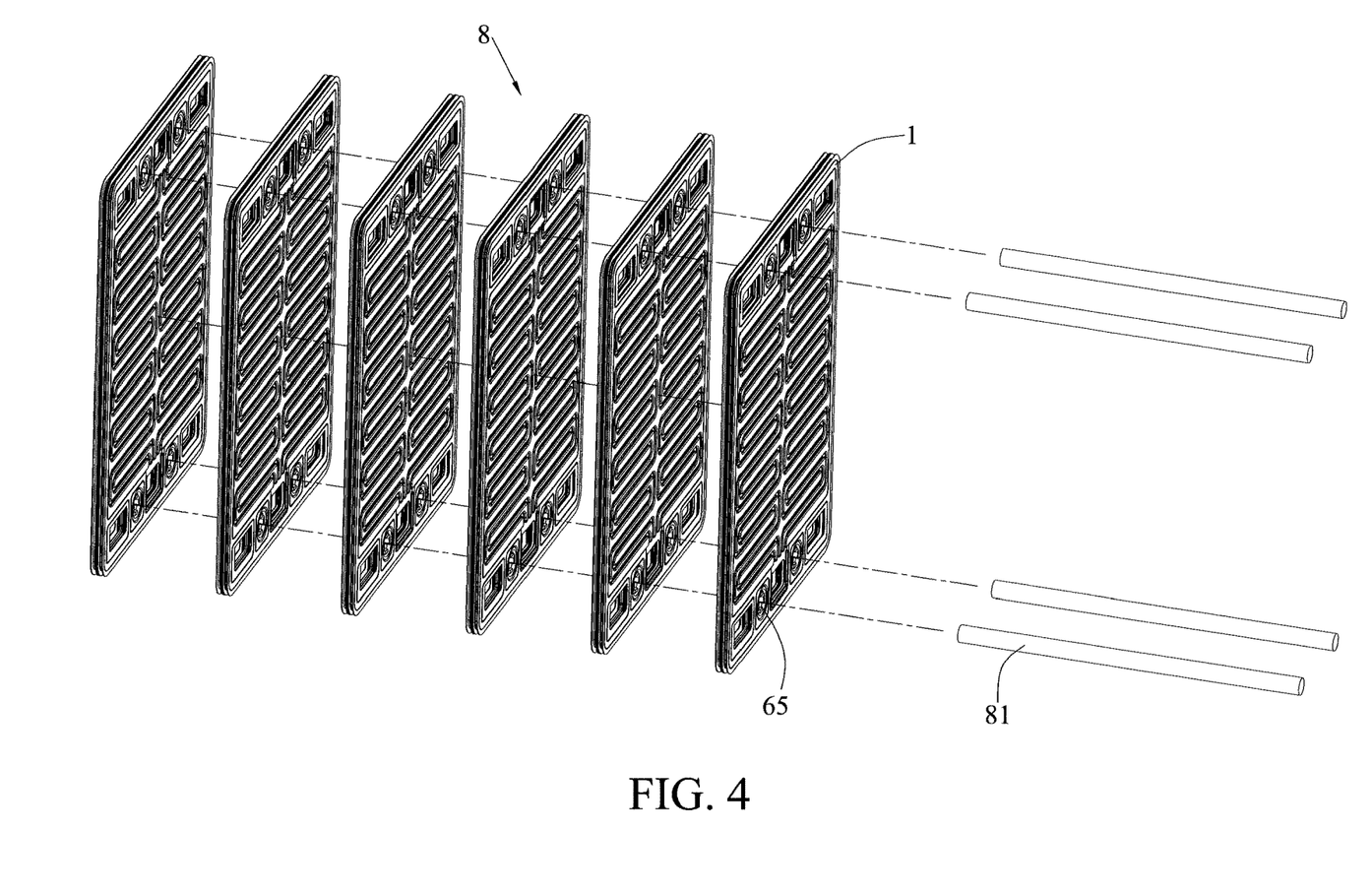
FIG. 4 is an exploded view of a fuel cell with a plurality of modular structures in accordance with the present disclosure.

The second fixing element 6 may include a second via hole 65 corresponding to the first via hole 53 of the first fixing element 5. The size (or aperture) of the second via hole 65 of the second fixing element 6 is smaller than the size (or aperture) of the first via hole 53 of the first fixing element 5. As shown in FIG. 4, at least one fastening element 81 can pass through the second via holes 65 of the second fixing elements 6 of a plurality of modular structures, so as to fasten a stack of modular structures 1 together into one fuel cell 8.

As shown in FIG. 1A, the modular structure 1 may include four gaskets 7, two of which are sealed between the first electrode plate 3 and the MEA 2 and between the MEA 2 and the second electrode plate 4, respectively, and the other two of which seal on top of the first electrode plate 3 and the second electrode plate 4, respectively, thereby forming an enclosed structure around the first electrode plate 3, the MEA 2 and the second electrode plate 4.

Each of the gaskets 7 may include at least one (e.g., four) fourth through hole 71 corresponding to the first through hole 31 to the third through hole 21. The first fixing element 5 and the second fixing element 6 can be joined together by passing themselves through the first through hole 31 to the fourth through hole 71 to fix the first electrode plate 3, the MEA 2, the second electrode plate 4, and the gaskets 7 in place. As such, a single cell module is formed from the first electrode plate 3, the MEA 2, the second electrode plate 4, and the gaskets 7.

As shown in FIG. 1A (from right to left), the modular structure 1 is formed by stacking a gasket 7, two first electrode plates 3 (e.g., a water cooling metal plate and a fuel metal plate), a gasket 7, a MEA 2, a gasket 7, two second electrode plates 4 (e.g., a water cooling metal plate and a fuel metal plate), and a gasket 7 sequentially.

As shown in FIGS. 1A to 3C, the first fixing element 5 and/or the second fixing element 6 may be made of a plastic material, an insulating material or a non-conductive material, such as silicone, vinyl chloride, polypropylene, nylon or the like. The gaskets 7 may be made of a plastic material, an insulating material or a non-conductive material, such as silicone, polyvinyl chloride, polyethylene, polypropylene or polystyrene. The insulating resistance of the first fixing element 5, the second fixing element 6, and/or the gaskets 7 can be greater than $10^9$ ohms ($\Omega$), and the temperature that the first fixing element 5, the second fixing element 6, and/or the gaskets 7 can withstand is greater than 60° C. Therefore, the first fixing element 5, the second fixing element 6, and the gaskets 7 according to the present disclosure provide insulation protection between the first electrode plate 3, the MEA 2, and the second electrode plate 4.

Figure 3A:
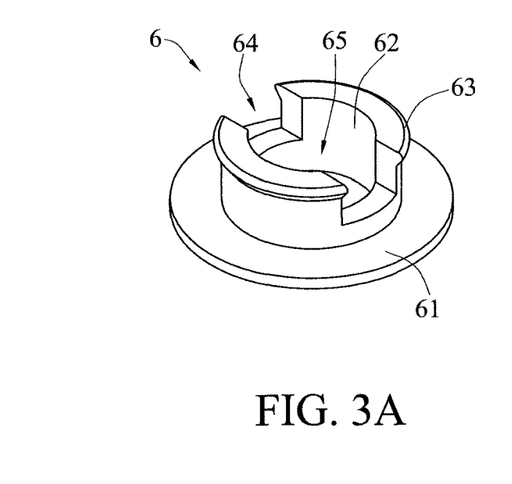
FIGS. 3A to 3C are schematic diagrams depicting various implementations of the second fixing element shown in FIG. 2C in accordance with the present disclosure.
Figure 3B:
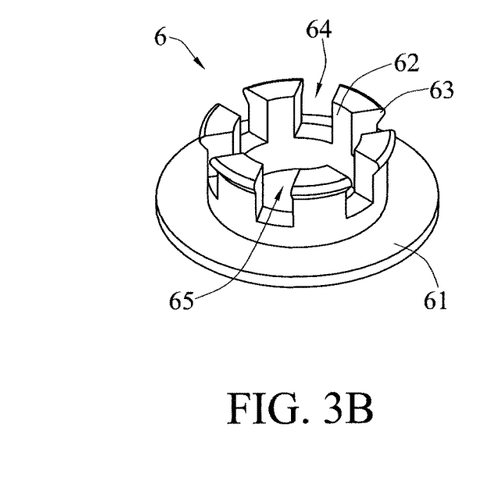
Figure 3C:
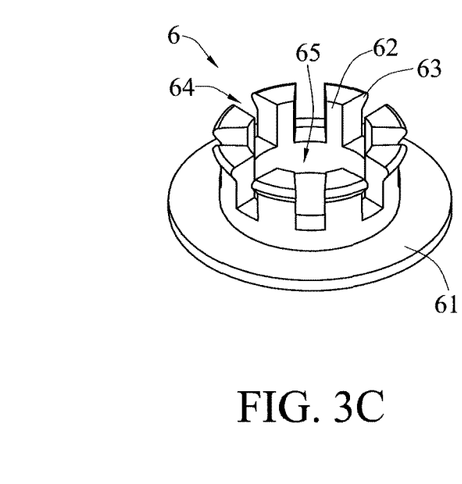

FIGS. 3A to 3C are schematic diagrams depicting various implementations of the second fixing element 6 shown in FIG. 2C in accordance with the present disclosure. As shown in FIG. 3A, the second fixing element 6 may have two protruding portions 62 and two concave portions 64 between the protruding portions 62. As shown in FIG. 3B, the second fixing element 6 may have six protruding portions 62 and six concave portions 64 among the protruding portions 62. As shown in FIG. 3C, the second fixing element 6 may have eight protruding portions 62 and eight concave portions 64 among the protruding portions 62. However, the present disclosure is not limited to those described herein.

FIG. 4 is an exploded view of a fuel cell 8 having a plurality of modular structures 1 in accordance with the present disclosure. As shown in FIG. 4 and FIGS. 1A to 3C, at least one fastening element 81 (e.g., a screw or a bolt) can be inserted into the second via holes 65 of the second fixing elements 6 of the plurality of modular structures 1, so as to fasten a stack of modular structures 1 together into the fuel cell 8.

It can be understood from the above that in the modular structure of fuel cell according to the present disclosure, two fixing elements are employed to fix at least one first electrode plate, a membrane electrode assembly, and at least one second electrode plate together to form a single cell module, thereby improving assembly accuracy, assembly speed, replacement efficiency or repair speed of the fuel cells or the single cell modules.

After a plurality of modular structures are assembled into a fuel cell, if one of the modular structures (single cell module block) is malfunctioned, the malfunctioned modular structure can be readily replaced by a new or well-functioning modular structure without taking the whole fuel cell apart to replace the broken component.

Moreover, a plurality of gaskets can be used for sealing between or on top of the first electrode plate, the MEA, and the second electrode plate, thus increasing air tightness of the modular structures of a fuel cell. Also, the two fixing elements are able to provide insulation protection between the first electrode plate, the MEA, and the second electrode plate. Furthermore, the fastening element allows fast assembly or disassembly of the modular structures into or from the fuel cell.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A modular structure of a fuel cell, comprising:
   a membrane electrode assembly (MEA);
   at least one first electrode plate disposed at one side of the MEA and having at least one first through hole;
   at least one second electrode plate disposed at the other side of the MEA and having at least one second through hole corresponding to the first through hole;
   at least one first fixing element; and
   at least one second fixing element corresponding to the at least one first fixing element,
   wherein the first fixing element and the second fixing element are joined to each other through the first through hole and the second through hole to fix the first electrode plate and the second electrode plate for the first electrode plate, the MEA and the second electrode plate to form a single cell module,
   wherein the first fixing element is distinct and independent from the first electrode plate and the second electrode plate, and the second fixing element is distinct and independent from the first electrode plate and the second electrode plate.

2. The modular structure of claim 1, wherein the MEA includes a proton exchange membrane layer, at least one catalyst layer, and at least one gas diffusion layer.

3. The modular structure of claim 1, wherein the MEA includes at least one third through hole corresponding to the first through hole and the second through hole, and the first fixing element and the second fixing element are joined to each other through the first through hole to the third through hole to fix the first electrode plate, the MEA, and the second electrode plate.

4. The modular structure of claim 1, wherein at least one of the first electrode plate and the second electrode plate is a metal plate, a graphite plate, or a composite graphite plate.

5. The modular structure of claim 1, wherein at least one of the first electrode plate and the second electrode plate is an anode plate, a cathode plate, or a bipolar plate.

6. The modular structure of claim 1, wherein at least two of the first electrode plates and the second electrode plates are metal plates fixed to each other through stamping or welding.

7. The modular structure of claim 1, wherein the first fixing element and the second fixing element each include a first engaging portion and a second engaging portion, and the first engaging portion and the second engaging portion are engaged with a portion of a surface of the first electrode plate and a portion of a surface of the second electrode plate, respectively.

8. The modular structure of claim 7, wherein the first fixing element includes a ring portion connected with the first engaging portion and engaged among the second fixing element, the MEA, the first electrode plate, and the second electrode plate.

9. The modular structure of claim 1, wherein at least one of the first fixing element and the second fixing element is made of a plastic material, an insulating material, or a non-conductive material.

10. The modular structure of claim 1, wherein at least one of the first fixing element and the second fixing element has an insulating resistance greater than $10^9$ ohms ($\Omega$).

11. The modular structure of claim 1, wherein at least one of the first fixing element and the second fixing element withstands a temperature greater than 60° C.

12. The modular structure of claim 1, further comprising at least one gasket sealed between the first electrode plate and the MEA and/or between the MEA and the second electrode plate, respectively.

13. The modular structure of claim 1, further comprising at least one gasket sealed on top of at least one the first electrode plate and the second electrode plate.

14. The modular structure of claim 1, wherein the first fixing element includes a first via hole, and the second fixing element includes at least two protruding portions passing through the first via hole to fix the second fixing element to the first fixing element.

15. The modular structure of claim 14, wherein the first fixing element further includes a bevel, and each of the protruding portions of the second fixing element includes a flange abutting against the bevel of the first fixing element.

16. The modular structure of claim 14, wherein the second fixing element further includes at least two concave portions between the protruding portions, and the concave portions have a space being compressed to force the second fixing element to be engaged with the first fixing element.

17. The modular structure of claim 14, wherein the second fixing element includes a second via hole corresponding to the first via hole of the first fixing element.

* * * * *